United States Patent [19]

Kirby

[11] Patent Number: 5,091,996

[45] Date of Patent: * Mar. 3, 1992

[54] FACE MASK

[76] Inventor: Richard C. Kirby, 6426 West Quaker Rd., Orchard Park, N.Y. 14127

[*] Notice: The portion of the term of this patent subsequent to Jun. 25, 2008 has been disclaimed.

[21] Appl. No.: 679,532

[22] Filed: Apr. 2, 1991

Related U.S. Application Data

[63] Continuation of Ser. No. 559,975, Jul. 27, 1990, Pat. No. 5,025,507, which is a continuation of Ser. No. 323,112, Mar. 13, 1989, abandoned, which is a continuation of Ser. No. 962,337, Nov. 3, 1986, abandoned.

[51] Int. Cl.$^5$ ............................................. A42B 1/18
[52] U.S. Cl. ........................................... 2/206; 2/171; 2/171.4; 2/202
[58] Field of Search ................... 2/9, 171, 171.4, 202, 2/205, 206, 256, 257, 259, 417; 128/206.12, 857

[56] References Cited

U.S. PATENT DOCUMENTS

| 924,613 | 6/1909 | Hellawell | 2/9 |
|---|---|---|---|
| 1,990,200 | 2/1935 | Nemzek | 2/206 |
| 1,994,212 | 3/1935 | Davis | 2/205 |
| 2,070,754 | 2/1937 | Schwartz | 128/206.12 |
| 2,081,779 | 5/1937 | Titus | 2/206 U X |
| 3,312,217 | 4/1967 | McKinstry . | |
| 3,740,767 | 6/1973 | Schuessler | 2/206 X |
| 3,828,366 | 8/1974 | Conrad et al. | 2/9 X |
| 4,180,868 | 1/1980 | Snow | 2/205 X |
| 4,285,068 | 8/1981 | Ross | 2/206 X |
| 4,300,549 | 11/1981 | Parker | 128/206.12 X |
| 4,323,063 | 4/1982 | Fisichella | 128/206.12 X |
| 4,589,408 | 5/1986 | Singer | 2/205 X |

FOREIGN PATENT DOCUMENTS

| 100134 | 4/1962 | Norway | 2/9 |
|---|---|---|---|
| 614668 | 12/1948 | United Kingdom | 2/9 |

Primary Examiner—Werner H. Schroeder
Assistant Examiner—Michael A. Neas
Attorney, Agent, or Firm—Hodgson, Russ, Andrews, Woods & Goodyear

[57] ABSTRACT

A face mask including a sheet of flexible material for concealing at least a portion of a hunter's face utilizes a wire secured to the sheet of material for positioning adjacent the eyes of the hunter and an elastic strap associated with the wire for securing the mask about the hunter's head. When the mask is operatively worn, at least a portion of the wire is positioned beneath and adjacent the hunter's eyes and is biased by the strap into close-fitting relationship with the skin of the hunter's face. The wire can be manually shaped along the length thereof to conform the contour of the wire to the general contours of the portions of the face across which the wire is adapted to overlie so that when the wire is biased against the wearer's face during wear of the mask, the mask is worn with relative comfort. The mask of this invention can be either in the form of a half-mask for covering only the lower portion of the hunter's face or in the form of a hood for concealing substantially the entire head of the hunter.

18 Claims, 2 Drawing Sheets

FACE MASK

This is a continuation of application Ser. No. 07/559,975, filed on July 27, 1990, now U.S. Pat. No. 5,025,507, which is a continuation of application Ser. No. 07/323,112, filed on Mar. 13, 1989, abandoned, which is a continuation of application Ser. No. 06/926,337, filed on Nov. 3, 1986, abandoned.

BACKGROUND OF THE INVENTION

This invention relates generally to garments for hunters and deals more particularly with a face mask used to conceal a hunter's face from approaching game.

It is known that by concealing a hunter from the view of wild game, the likelihood that the game will advance into close proximity to the hunter is substantially increased, and in hunting applications, such as archery or waterfowl hunting, in which the game must move into relatively close proximity to the hunter for the hunter to obtain a desirable shot at the game, concealment from view is of particular importance.

In order to reduce the reflectivity or visability of a hunter's face while hunting game, a suitable mask or hood can be worn about the hunter's head, which mask or hood includes a sheet of material for covering a substantial portion of the face. Commonly, the sheet of material bears a pattern or print intended to visually blend with the hunter's surroundings or background so that the hunter's face is camouflaged by the mask.

One type of face mask with which this invention is to be compared is in the form of a hood for positioning about the head of a hunter and in which are defined two eyeholes through which the hunter must see when the mask is operatively worn. One limitation associated with such a hood relates to the relatively limited field of peripheral vision provided by the hood and the suceptibility of the hood material to being moved in an undulating fashion by the wind. Such a limiting of peripheral vision and susceptibility to being moved by the wind are believed to be due, at least in part, to the relatively loose-fitting relationship between the portion of the hood defining the eyeholes and the face of the hunter which necessitates an appreciable turning of the head for the hunter to look toward his left or right and which permits the hood material to flap or otherwise move relative to the hunter's eyes. Of course, in hunting applications in which the hunter and his garments should remain as still as possible so as not to distract game being hunted, any appreciable turnings of the head or flappings of the hood material are undesirable occurances.

Another limitation associated with the aforedescribed hood relates to the possible interference of the hood with the aiming of the hunter's weapon. More specifically, and inasmuch as a hunter typically sights his weapon along a line of sight directed from one eye and generally across the nose, the aforedescribed line of sight is apt, in many instances, to be obstructed by the piece of material necessarily defined between the two hood eyeholes.

Still another limitation of the aforedescribed hood relates to the difficulties attending the wearing of such a mask by a hunter who wears glasses. In the first instance, the eyeholes of the hood are difficult to position and maintain in alignment with the eyepieces of glasses when the hood is placed over the head and worn, and in the second instance, many conventional hoods of this type are devoid of means permitting suitable air circulation therethrough for preventing the hunter's glasses from fogging.

Accordingly, it is an object of the present invention to provide a new and improved face mask for a hunter which circumvents the aforediscussed limitations associated with conventional face masks.

Another object of the present invention is to provide such a face mask providing a hunter with improved peripheral vision and which is devoid of means which could otherwise obstruct the hunter's line of sight during the aiming of his weapon.

Still another object of the present invention is to provide such a mask including an eyepiece portion adapted to fit in close-fitting relationship against the hunter's face and adjacent the eyes.

Yet still another object of the present invention is to provide such a mask which can be comfortably worn by any hunter having a head size within a broad range of head sizes.

A further object of the present invention is to provide such a mask which is particularly well-suited for use by a hunter who wears glasses.

A still further object of the present invention is to provide such a mask including means permitting air circulation therethrough.

A yet still further object of the present invention is to provide such a mask in the form of a hood for positioning about the hunter's head so as to substantially cover the entire head of the hunter.

An additional object of the present invention is to provide such a mask in the form of a half-mask for positioning about the hunter's head so as to substantially cover the lower portion of the hunter's face.

SUMMARY OF THE INVENTION

This invention resides in a new and improved face mask for concealing at least a portion of wearer's face.

The face mask includes a sheet of flexible material, elongate means, and an elastomeric strap. The sheet of flexible material includes a first section positionable generally beneath the eyes and across the face of a wearer and a depending section attached to the first section for depending generally downwardly from the first section when the mask is operatively worn. The elongate means is associated with the first section and includes two side portions and a mid-portion extending between the two side portions so that when the mask is operatively worn, the elongate means overlies the wearer's face so that each side portion is positioned adjacent a corresponding side of the wearer's face and the mid-portion is positioned generally beneath the wearer's eyes and across the wearer's nose. The elastomeric strap is joined to each side portion of the elongate means for holding the elongate means in operative position across the wearer's face and adjacent the wearer's eyes. The elongate means is capable of being manually shaped along the length thereof so that the contour of the elongate means can be altered to conform to the contours of the portions of the wearer's face across which the elongate means is adapted to overlie.

BRIEF DESCRIPTION OF THE DRAWING FIGURES

DETAILED DESCRIPTION OF THE ILLUSTRATED EMBODIMENTS

Figure 1:
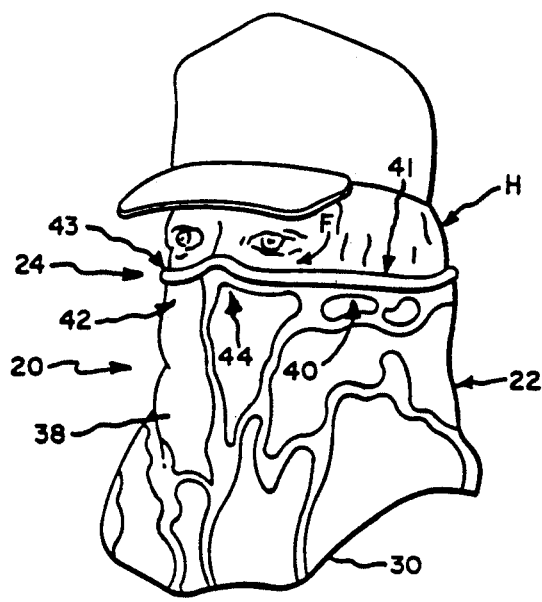
FIG. 1 is a perspective view of an embodiment of a mask in accordane with the present invention shown operatively worn by a hunter.

Turning now to the drawings in greater detail and considering first FIG. 1, there is shown a face mask, generally indicated 20, in accordance with the present invention and operatively worn by a hunter H. The face mask 20 is of a type of mask known as a half-mask in that the portion of the hunter's head concealed by the mask includes the lower portion of the hunter's face and the sides of the hunter's head. As will be apparent hereinafter, the mask 20 provides the hunter H with an unobstructed view over the top of the mask 20 while the mask 20 fits comfortably about the hunter's head.

Figure 2:
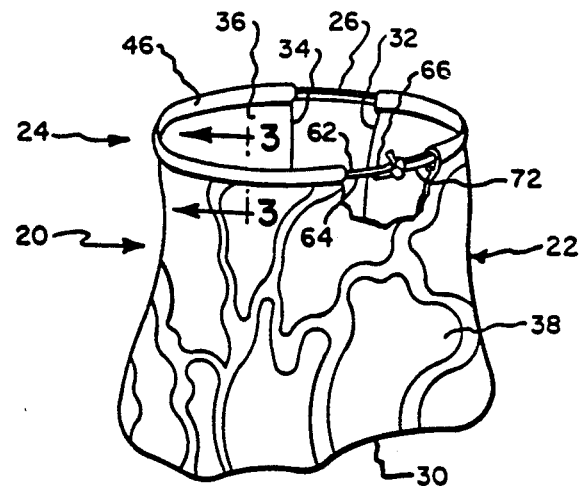
FIG. 2 is a fragmentary perspective view, shown partially cutaway, of the FIG. 1 embodiment.
Figure 3:
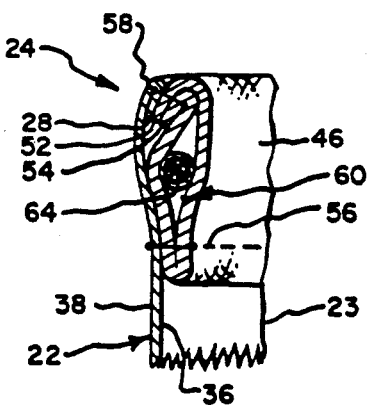
FIG. 3 is a cross-sectional view taken about on lines 3—3 of FIG. 2.
Figure 4:
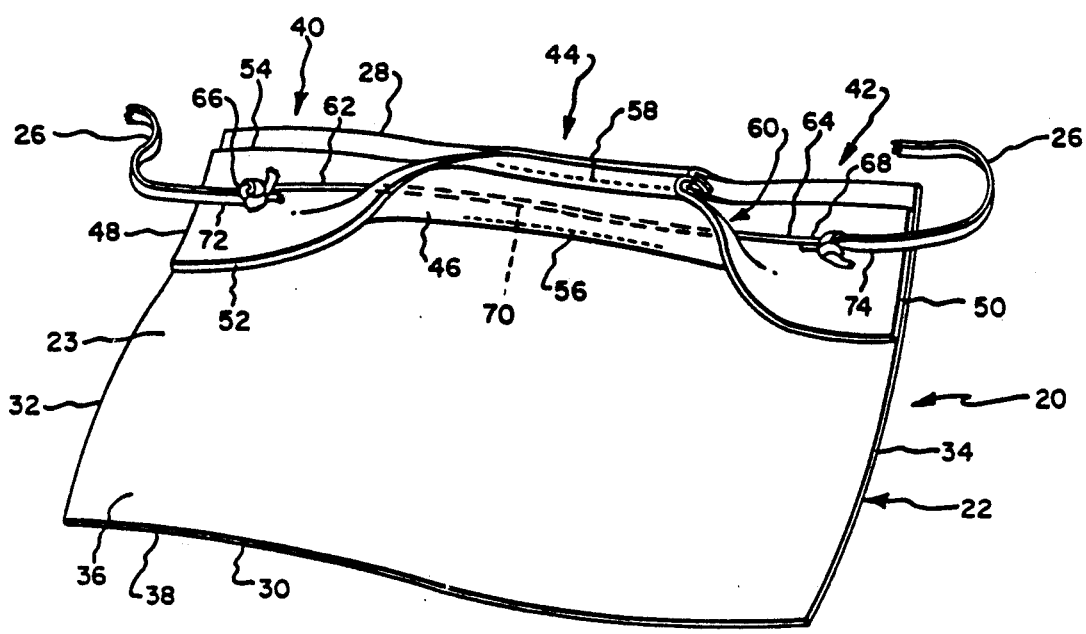
FIG. 4 is a fragmentary perspective view of the FIG. 1 embodiment shown partially assembled.

With reference to FIGS. 1-4, the face mask 20 includes a sheet 22 of flexible material, elongate means 24 positionable across the hunter's face and elastomeric means in the form of an elastic strap 26 for securing the elongate means 24 and the sheet 22 in operative position about the hunter's head. As best shown in FIG. 4, the sheet 22 includes a rectangular piece 23 of material defining a linear top edge 28, a bottom edge 30, two opposite and parallel side edges 32,34, and inside and outside surfaces 36,38, respectively. In the mask embodiment 20, the sheet 22 is comprised of a nylon net material but can be comprised of any of a number of suitable materials such as a cotton or a cotton/polyester blend in accordance with the broader aspects of the invention.

To enhance the concealment of the hunter H in the location which he is situated, it is preferred that the outer surface of the mask sheet 22 bears a print or pattern which visually simulates the appearance of the environment in which the hunter is located. In the mask embodiment 20, the outer surface 38 bears a camouflage print or pattern intended to provide the appearance of a wooded environment, but it will be understood that the outer surface 38 may bear an alternative pattern or print in accordance with the present invention.

With reference still to FIGS. 1-4, the sheet 22 further includes a strip, indicated 46, of relatively soft material attached to the rectangular piece 23 adjacent the top edge 28 thereof. As best shown in FIG. 4, the material strip 46 defines opposite and parallel side edges 48,50 and two opposite and parallel bottom and top edges 52,54, respectively, and is shown in FIG. 4 as positioned in overlying engagement with the inside surface 36 of the rectangular piece 23. The length of the strip 46 as measured between the side edges 48,50 is about equal to the width of the rectangular piece 23 as measured between the piece side edges 32,34 so that the side strip edge 48 is substantially even with the piece edge 32 and the strip side edge 50 is even with the piece side edge 34. For purposes of attaching the strip 46 to the piece 23 and as illustrated in FIG. 4, the strip 46 is folded over upon itself so that the strip edges 52 and 54 engage one another. At that point, the narrow section of the rectangular piece 23 adjacent the piece edge 28 is folded so as to engage the engaging strip edges 52,54 in the manner illustrated in FIG. 4, and the strip 46 and piece 23 are stitched together with thread along parallel stitch lines, indicated 56 and 58, extending from one side edge 48 of the strip to the other strip side edge 50 and generally parallel to the piece edge 28. When stitched as aforedescribed and as best shown in FIG. 3, the strip 46 defines a sleeve, generally indicated 60, within which the elongate means 24, hereinafter described, is positioned.

Inasmuch as the strip 46 is intended to provide a cushioned layer between the elongate means 24 and the skin of the hunter's face, it is preferred that the material comprising the strap 46 be relatively soft. The strip 46 of the mask embodiment 20 is comprised of a cotton knit but any of a number of other suitable materials can be substituted therefor.

With reference still to FIG. 4, the elongate means 24 includes two side edges 40,42 and a mid-portion 44 extending between the two side portions 40,42. When the elongate means 24 is operatively positioned across the hunter's face and is best shown in FIG. 1, each side portion 40 or 42 is positioned adjacent a corresponding side of the hunter's face at a location indicated 41 or 43, respectively, and the mid-portion 44 is positioned generally across the facial region indicated F and extending generally beneath the hunter's eyes and across his nose.

In accordance with the present invention, the elongate means 24 is manually shapeable along the length thereof so that the contours of the elongate means 24 can be altered in a desired manner. As will be apparent hereinafter, such a shape-altering capacity permits the hunter H to conform the shape of the elongate means 24 to the contours of the portions of the face across which the elongate means 24 is operatively positionable. With reference to FIG. 4, the elongate means 24 includes an elongate body 62 possessing such flexibility that it can be manually bent along the length thereof with relative ease yet possess such rigidity that retains its shape when bent. In the mask embodiment 20, the elongate body 62 is in the form of a length of insulated copper wire 64 of twelve gauge, but any of a number of other wires possessing an alternative composition, such as lead, brass or steel, and/or wire size can be used to comprise the elongate body 62.

As best shown in FIG. 4, the wire 64 is slightly shorter in length than the width of the rectangular piece 23 as measured between the piece side edges 32,34 yet is long enough to span the width of a relatively broad face. The wire 64 defines opposite end or side portions 66 or 68 which each provide a corresponding one of the side portions 40 or 42 of the elongate means 24 and further defines a mid-portion 70 extending between the side portion 66 and 68 which provides the mid-portion 44 of the elongate means 24. Each of the side portions 66 or 68 is folded back upon itself so as to define a U-shaped crook at its corresponding end for a reason which will be hereinafter apparent. The wire 64 is positioned within so as to be received by the sleeve 60, and, as shown in FIG. 4, is arranged substantially centrally along the length of the sleeve 60.

With reference to FIGS. 2 and 4, the elastic strap 26 is elongated in shape, confines two opposite ends 72,74 and is attached to the wire 64 for purposes of securing the mask 20 about the hunter's head. More specifically, the strap end 72 is tied and knotted about the crooked formed by the wire side portion 66, and the strap end 74 is tied and knotted about the crook formed by the wire side portion 68 so that an opening for the head is collectively defined by the strap 26 and the wire 64. For purposes of holding or retaining the wire 64 in a relatively snugfitting relationship against the hunter's face, the length of the strap 26 is sized so that when the elongate means 24 are operatively positioned in front of the hunter's head, the strap 26 is positioned in a stretched condition across the back of the head.

In order to operatively position the mask 20 about the hunter's head, the elongate means 24 is grasped with one hand, the strap 26 is grasped with the other hand and the opening defined by the strap 26 and elongate means 24 is manipulated downwardly over the hunter's head until the strap 26 and elongate means 24 are arranged in substantially a horizontal plane oriented slightly beneath the hunter's eyes. The mask 20 subsequentially arranged about the head so that the elongate means 24 generally spans the facial region F (FIG. 1) and the strap 26 is arranged so as to extend across the back of the head. At that point, the elongate means 24 are bent with the fingers to conform the shape of the elongate means 24 in conformity to the contours of the hunter's face, which facial contours can be traced along the facial region F extending from one side of the hunter's face to the other and oriented generally beneath the eyes. Commonly, and as shown in FIG. 1, the midpoint 44 of the elongate means are shaped so as to define a generally inverted U to accommodate the hunter's nose and the side portions 40,42 are shaped to accommodate the hunter's cheekbones.

By shaping the elongate means 24 in conformity to the contours of the face as aforedescribed, pressure applied to the face as a consequence of the elastic biasing of the elongate means 24 against the face is distributed relatively evenly along the length of the elongate means 24. Such an even pressure distribution across the face renders the mask 20 comfortable when worn.

Figure 5:
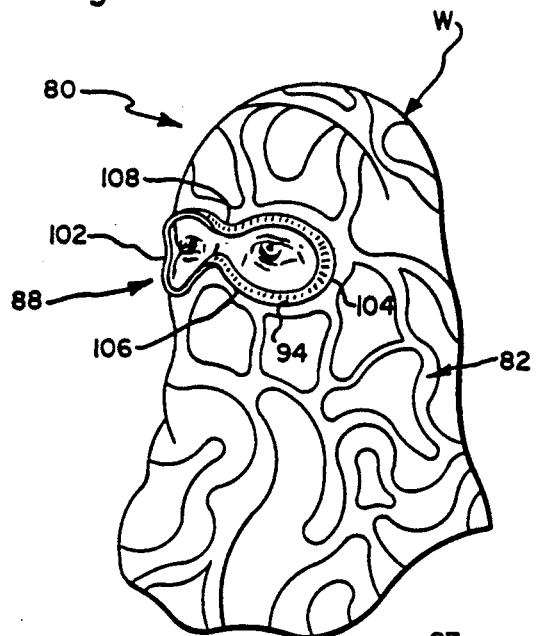
FIG. 5 is a perspective view of another embodiment of a mask in accordance with the present invention shown operatively worn by a hunter.
Figure 6:
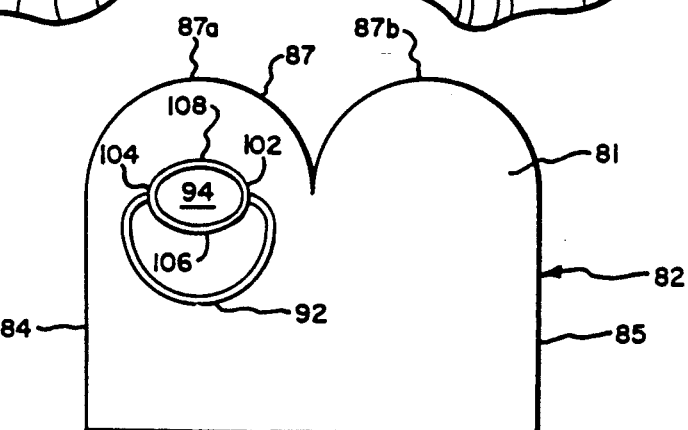
FIG. 6 is a plan view of a portion of the FIG. 5 embodiment shown exploded so as to illustrate the sheet material portion thereof when placed in a spread condition.

With reference to FIGS. 5-9, there is illustrated an alternative embodiment, generally indicated 80, of a mask in accordance with the present invention shown operatively worn upon the head of a wearer W. The mask 80 includes a sheet 82 of flexible material forming a hood for covering substantially the entire head of the wearer W, elongate means 88 for positioning adjacent the wearer's eyes, and elastomeric means in the form of an elastic strap 92 for securing the mask 80 in operative position about the wearer's head. As best shown in FIG. 6, the sheet 82 includes a piece 81 of a piece of material having two opposite and parallel side edges 84,85, a lower edge 86 and an upper edge 87 defining two arcuate sections 87a,87b extending between the side edges 84,85 as shown. The piece 81 is stitched in a manner joining the edges 84 and 85 to one another and joining the arcuate edges 87a and 87b to one another so as to form the aforementioned hood. The piece 81 is so sized that when stitched as aforedescribed so as to form the hood and operatively positioned upon the head in FIG. 5, the front sides and back of the hood drape generally downwardly from the top of the head to the wearer's shoulders.

Figure 7:
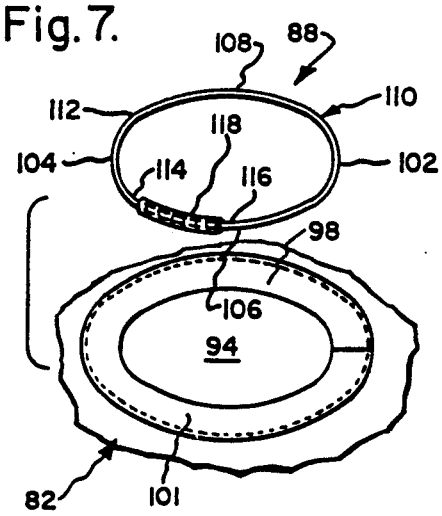
FIG. 7 is a perspective view of a fragment of the FIG. 5 mask illustrating the fragment in an early stage of assembly.
Figure 8:
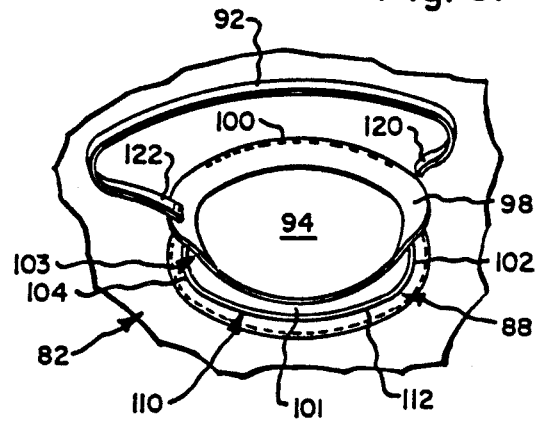
FIG. 8 is a perspective view of the fragment of FIG. 7 shown in an advanced stage of assembly.

With reference to FIGS. 7 and 8, the sheet material piece 81 defines a somewhat oval-shaped opening 94 intended to be positioned in front of the wearer's eyes when the mask 80 is operatively worn so that the opening 94 generally encircles both eyes. The sheet material 82 further includes a relatively narrow strip 98 of soft flexible material having its opposite edges stitched to the piece 81 along the opening 94 defined therein. The strip 98 thereby provides an edging for the opening 94. Furthermore, when the assembly of the mask 80 is complete and as best illustrated in FIG. 8, the strip 98 is folded back upon itself and stitched to the piece 84 along the stitch line 100 to provide a loop-like sleeve 101 within which the elongate means 88 is retainably received.

The sheet piece 81 is comprised of a nylon net bearing a camouflage print on the outer surface thereof, and the strip 98 is comprised of a relatively soft, cotton knit, but as is the case with the components comprising the sheet 22 of the mask 20 of FIGS. 1-4, the piece 81 and strip 98 comprising the sheet 82 can be any of a number of suitable materials.

With reference again to FIGS. 5-8, the elongate means 88 includes two opposite side portions 102,104 and lower and upper mid-portions 106,108, respectively, extending between the side portions 102,104. When the mask 80 is operatively worn upon the wearer's head, the lower and upper mid-portions 106,108 are positioned generally beneath and above, respectively, the wearer's eyes and extend generally across the face, and each of the side portions 102,104 are positioned adjacent a corresponding side of the wearer's face.

In accordance with the present invention, the elongate means 88 is manually shapable in conformity to the contours of the portions of the wearer's face across which the elongate means 88 is adapted to overlie when the mask 80 is operatively worn. In the mask embodiment 80 and as best shown in FIGS. 7 and 8, the elongate means 88 includes an elongate body 110 in the form of a wire loop 112. The elongate body 110 is constructed of a single piece of twelve gauge insulated copper wire having two end portions 114,116 which are taped together in an end-to-end fashion with a piece of tape 118. For purposes of securing the wire loop 112 to the piece 84, the loop 112 is placed so as to overlie the edging strip 98 when the strip 98 is arranged in its spread condition of FIG. 7, and the innermost edge of the strip 98 is folded back upon itself in the manner illustrated in FIG. 8 and stitched along the stitch line 100 to thereby enclose and securably retain the wire loop 112 within the defined sleeve 103. It follows that the wire loop 112 is about equal in size to that of the opening 94.

With reference to FIG. 8, the elastic strap 92 defines two opposite ends 120,122 which are each stitched to the edging strip 98 adjacent a corresponding one of the side portions 102,104 of the elongate means 88. As was the case of the elastic strap 26 of the mask 20 of FIGS. 1-4, the elastic strap 92 is sized so that when the elongate means 88 is operatively positioned across the wearer's face, the strap 92 is arranged in a stretched condition across the back of the wearer's head so that the elongate means 88 are biased or drawn into a snug-fitting relationship with the wearer's face.

In order to operatively position the mask 80 upon the head of the wearer, the mask 80 is initially placed upon the head so that the hood formed by the mask sheet 82 is draped about the head as shown in FIG. 5 and the mask components are manipulated so that the elongate means 88 are positioned so as to substantially encircle both eyes and the strap 92 is arranged in a stretched condition across the back of the head. At that point, selected portions of the elongate means 88 are bent with the fingers so that the contour of the elongate means 88 is altered in general conformity to the contours of the face portions across which selected portion of the elongate means 88 are adapted to rely. Commonly, and as shown in FIG. 1, the lower mid-portion 106 of the elongate means 88 is shaped to accommodate the wearer's nose and the side portions 102,104 are appropriately shaped to accommodate the wearer's cheekbones. With the elongate means 88 shaped in general conformity with the regions of the face across which the elongate means 88 overlies, the mask 20 is comfortably worn.

It is apparent from the foregoing that the capacity of the elongate means of the mask of this invention to be altered in shape enables a single mask to be rendered comfortable for wear by hunters having heads of substantially dissimilar widths or possessing substantially dissimilar facial contours.

Another advantage provided by the mask of this invention relates to the relatively snug-fitting relationship provided between the elongate means and the skin of the hunter's face in the region adjacent the hunter's eyes. Such a snug-fitting relationship maintains the portion of the sheet material of the mask positioned adjacent the eyes in a condition against the hunter's face so that the mask sheet cannot flap or move in front of the hunter's eyes when exposed to a breeze so as to obstruct the hunter's vision and effectively enhances the hunter's peripheral vision.

Still another advantage of the mask of this invention relates to the absence therein of means which could interfere with the sighting of the hunter's weapon. For example and as illustrated in FIG. 1, the mask embodiment 20 is positioned adjacent the hunter's eyes so as to permit unobstructed vision over the top of the mask 20 and as illustrated in FIG. 5, the mask embodiment 80 provides a single somewhat oval-shaped opening through which both eyes of the hunter are provided with an unobstructed view. In particular, neither mask embodiment 20 or 80 provides means which could interfere with a line of sight directed from one eye and across the nose.

Figure 9:
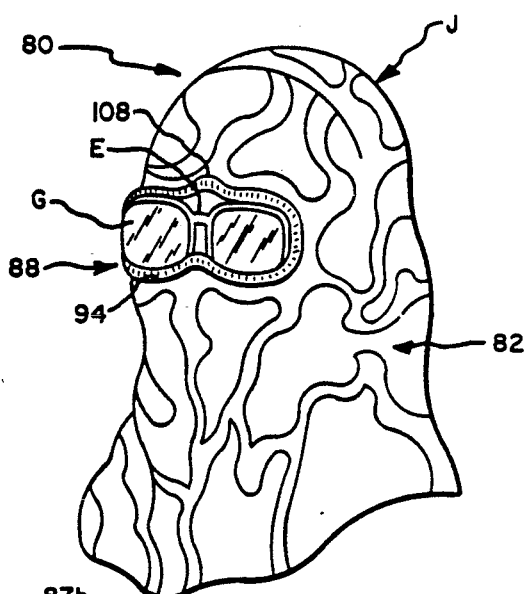
FIG. 9 is a perspective view of the FIG. 5 embodiment shown operatively worn by a hunter wearing glasses.

A further advantage of the mask of the present invention relates to the adaptability of the mask for wearing by a hunter who wears glasses. For example, there is shown in FIG. 9, a hunter, generally indicated J, wearing a pair of glasses, indicated G, and also wearing the mask 80 of FIGS. 5-8. As illustrated in FIG. 9, various portions of the elongate means 88 of the mask 80 are formed or shaped to substantially conform to the general outline of the eyepiece frame E of the glasses G so that when operatively positioned thereabout and drawn toward the face by the strap 92 (FIGS. 6 and 8), the elongate means 88 is snugly held about the eyepiece frame E so that each of the two eyepieces of the Glasses G are maintained in alignment with the sheet opening 94 for viewing therethrough.

Considering still advantages provided by this invention in connection with hunters who wear glasses, the mask 80 of FIGS. 5-9 provides an additional advantage in that the elongate means 88 thereof facilitates the circulation of air through the mask hood to thereby reduce the likelihood that the hunter's glasses will fog up when the mask 80 is worn. To this end and with reference again to FIG. 9, there is shown the upper mid-portion 108 of elongate means 88 being so shaped to define an inverted U centrally thereof. The defined inverted U provides an air vent in the front of the mask 80 which has been found to provide sufficient circulation through the mask 80 to prevent fogging of the glasses G.

It will be understood that numerous modifications and substitutions can be had to the aforedescribed embodiments without departing from the spirit of the invention. For example, although each of the elongate bodies of the elongate means 80,88 of the mask embodiments 20 and 80 have been shown and described above as including a length of deformable wire, it will be understood that an elongate body in accordance with the broader aspects of the present invention can include an elongate body of a suitable clay composition, such as modeling clay, capable of being manually shaped along its length for conforming the contour of the elongate body to contours of the face. Accordingly, the aforedescribed embodiments are intended for purposes of illustration and not limitation.

I claim:

1. A face mask comprising:
   a) a sheet of flexible material having a camouflage pattern for partially concealing a hunter's face and positionable generally about the face of the wearer and depending generally downwardly from the bridge of the nose of the wearer when the mask is operatively worn so as to cover the end of the nose and the regions of the wearer's cheeks immediately beneath the eyes;
   b) elongate means associated with said sheet and including two side portions and a mid-portion extending between said side portions and possessing sufficient length so that when the mask is operatively worn, said elongate means generally spans the entire width of and overlies the wearer's face so that each of said side portions is positioned adjacent a corresponding side of the wearer's face, said elongate means being in the form of a loop for generally encircling both eyes of the wearer when the mask is operatively worn and for defining an unobstructed single open viewing space for both eyes;
   c) elastomeric means joined to said elongate means for securing said elongate means in operative position across the face and encircling the eyes of the wearer;
   d) said elongate means being manually shapeable along the length thereof and in conformity with the contours of the wearer's face and capable of retaining its shape once bent in conformity to the face contours so that the contours of said elongate means can be altered to conform to the contour of the portions of the wearer's face across which the elongate means is positioned to overlie and each of said side portions can be bent rearwardly of the face at the corresponding side of the wearer's head so that any part of said sheet of material located outboard of the wearer's eyes is effectively held by said side portions out of the wearer's peripheral field of vision; and
   e) sleeve means associated with said sheet of material and forming a sleeve within which said elongate means is positioned.

2. A face mask according to claim 1, wherein said elongate means is of narrow cross-section.

3. A face mask according to claim 1, wherein said elongate means is in the form of a wire.

4. A face mask according to claim 1, wherein said wire is composed of metal.

5. A face mask according to claim 1, wherein said elongate means is a metal wire of twelve gauge size.

6. A face mask according to claim 1, wherein said elongate means includes an elongate body of deformable material capable of being bent along the length thereof.

7. A face mask according to claim 1, wherein said elastomeric means includes an elastomeric member extending between the side portions of said elongate means so that when said mask is operatively worn, the elastomeric member is arranged in a stretched condition across the back of the head and biases the elongate means into a snug-fitting relationship with the front of the wearer's face.

8. A face mask according to claim 7, wherein said elastomeric member is in the form of an elastic strap having two opposite ends, each of said strap ends being joined to the corresponding one of the side portions of the elongate means.

9. A face mask according to claim 1, wherein said sleeve means includes means defining a relatively soft layer for positioning between said elongate means and the skin of the wearer's face.

10. A face mask according to claim 1, wherein said sleeve means is of a material sized and shaped to accommodate the formation of said sleeve means into a loop about said open viewing space without appreciably wrinkling said sleeve means.

11. A face mask according to claim 10, wherein the material out of which said sleeve means is constructed possesses a degree of stretchability.

12. A face mask according to claim 11, wherein the material out of which said sleeve means is constructed is a knitted material.

13. A face mask according to claim 1, wherein said sleeve means and said sheet material are constructed of dissimilar materials.

14. A face mask according to claim 1, wherein said sleeve means includes a relatively thin wall so as not to appreciably contribute to the bulkiness of the mask adjacent said open viewing space.

15. A face mask according to claim 1, wherein said sleeve means is constructed so as to provide a cushion of relatively uniform softness along the entire length of the elongate means.

16. A face mask according to claim 1, wherein said sheet of flexible material is net material which has an outer surface which bears said camouflage pattern.

17. A face mask according to claim 16, wherein said sleeve means is composed of a knitted material.

18. A face mask according to claim 1, wherein said sleeve means is composed of a knitted material.

* * * * *